Jan. 4, 1927.
R. C. SMITH
1,613,541
FRICTION BRAKE
Filed Sept. 3, 1925
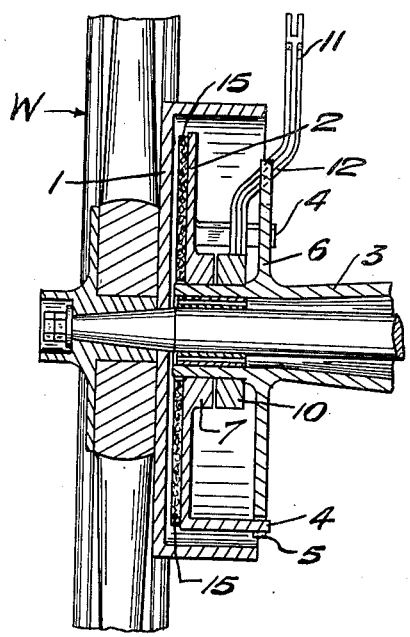
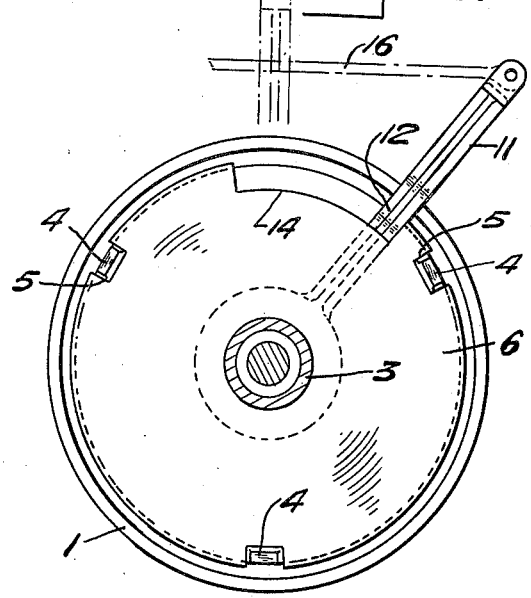
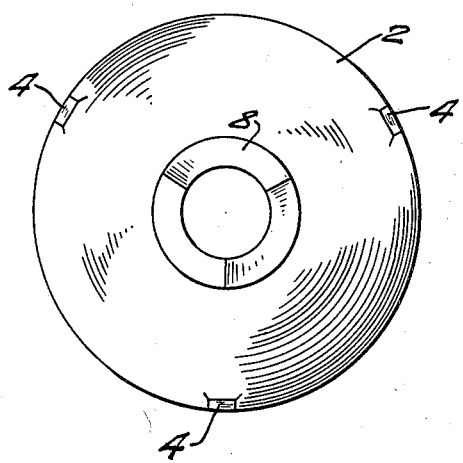
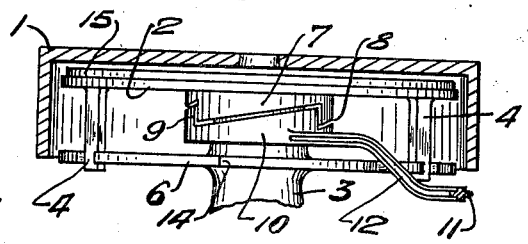
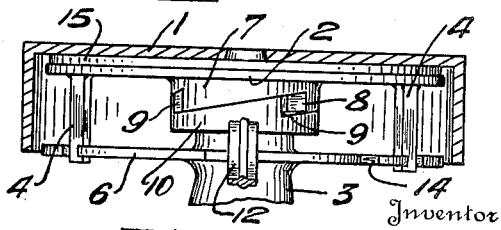
Inventor
Robert Calvin Smith
By Watson E. Coleman.
Attorney Patented Jan. 4, 1927.

1,613,541

UNITED STATES PATENT OFFICE.

ROBERT CALVIN SMITH, OF TIOGA, WEST VIRGINIA, ASSIGNOR OF ONE-THIRD TO GEORGE ALEXANDER RIPPETOE AND ONE-THIRD TO CURTIS ECHOLS RIPPETOE, BOTH OF RICHWOOD, WEST VIRGINIA.

FRICTION BRAKE.

Application filed September 3, 1925. Serial No. 54,318.

This invention relates to certain improvements in friction brakes and it is an object of the invention to provide a device of this general character adapted to be employed in connection with the conventional brake drum and which operates as an effective emergency or safety brake.

Another object of the invention is to provide a brake of this kind comprising a member or drum rotatable with a wheel together with a non-rotary friction clutch or disc adapted to be moved into requisite engagement with the member or drum to effect the desired braking action.

The invention consists in the details of construction and in the combination and arrangement of the several parts of my improved friction brake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein :—

Figure 1 is a sectional view taken through a brake constructed in accordance with an embodiment of my invention and in applied position;

Figure 2 is a view partly in section and partly in inner or rear elevation of the structure as illustrated in Figure 1, a second position of certain of the parts together with an operating rod being indicated by broken lines;

Figure 3 is a view in inner or rear elevation of the non-rotary disc or clutch unapplied;

Figure 4 is a view partly in top plan and partly in section of the structure as illustrated in Figure 2;

Figure 5 is a view similar to Figure 1 but showing certain of the parts in a second position.

As disclosed in the accompanying drawings, 1 denotes a conventional brake drum or member secured to the wheel W proper for rotation therewith and movable toward or from the member or drum 1 is a clutch member or disc 2 having requisite sliding movement upon an end portion of the axle housing 3. This member or disc 2 is provided at its peripheral portion with a series of circumferentially and equidistantly spaced elongated lugs or arms 4 preferably integrally formed therewith and which are disposed in a direction away from the drum or member 1. The outer or free end portions of these arms or lugs 4 pass through the recesses or notches 5 formed in the peripheral portion of the housing flange or plate 6, said flange or plate 6 being integral with the housing 3 or otherwise fixedly secured thereto.

The member or disc 2 is provided with an outwardly disposed hub 7 having its outer or free end provided with the cam notches 8 adapted to interlock with the cam notches 9 carried by the inner face of the disc or plate 10 rotatably mounted upon the housing 3 outwardly of the flange or plate 6. Formed with and extending upwardly from the disc or plate 10 is a lever 11 having its upper or free end portion outwardly offset, as at 12. This offset portion 12 extends through an elongated peripheral recess or notch 14 in the flange or plate 6 and is of sufficient length to permit requisite movement of the lever 11 to cause the cam notches 9 of the disc or plate 10 to coact with the cam notches 8 of the hub 7 to force the clutch member or plate 2 in requisite frictional contact with the member or plate 1 to effect the desired braking action. The efficiency of the braking action of the clutch member or plate 2 is materially increased by disposing over the working face thereof a lining or lamination 15 of fibre or kindred material.

Desired movement may be imparted to the lever 11 in any desired manner but as illustrated by dotted lines in Figure 2, such means comprises a rod 16. This rod 16 will lead to any suitable part of a vehicle and may be pushed or pulled in any manner preferred. As any means may be employed in connection with the rod 16 for operating the same, a detailed description and illustration thereof is believed unnecessary.

From the foregoing description it is thought to be obvious that a friction brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carying out my invention in practice except as hereinafter claimed.

I claim:—

1. In combination with a vehicle wheel, and a housing for the axle of said wheel, said housing being provided with a fixed flange adjacent to the wheel, said flange being provided in its peripheral portion with a plurality of circumferentially spaced recesses, a fixed drum carried by the wheel, a clutch member slidably mounted on the housing between the drum and wheel, arms carried by the peripheral portion of the clutch member and extending through the recesses of the flange of the housing to hold said member against rotation, said clutch member being provided with a hub having a cam face at one end, a member rotatably mounted on the housing between the fixed flange and the clutch member, said rotatable member having a cam end coacting with the cam face of the hub whereby the clutch member is forced into frictional contact with the fixed drum of the wheel upon rotation in one direction of the last named member, and an operating lever carried by said last named member and having its outer portion offset, said offset portion being received within an elongated recess in the flange of the housing.

2. In combination with a vehicle wheel and a housing for the axle of said wheel, said housing being provided with a fixed flange adjacent to the wheel, said flange being provided in its peripheral portion with a plurality of circumferentiatly spaced recesses, a fixed drum carried by the wheel, a clutch member slidably mounted on the housing between the drum and wheel, arms carried by the peripheral portion of the clutch member and extending through the recesses of the flange of the housing to hold said member against rotation, said clutch member being provided with a hub having a cam face at one end, a member rotatably mounted on the housing between the fixed flange and the clutch member, said rotatable member having a cam end coacting with the cam face of the hub whereby the clutch member is forced into frictional contact with the fixed drum of the wheel upon rotation in one direction of the last named member, and means for rotating said member.

In testimony whereof I affix my signature.

ROBERT CALVIN SMITH.